United States Patent
Dangler et al.

(10) Patent No.: US 8,251,749 B2
(45) Date of Patent: Aug. 28, 2012

(54) IMPLEMENTING IMPEDANCE GRADIENT CONNECTOR FOR BOARD-TO-BOARD APPLICATIONS

(75) Inventors: John Richard Dangler, Rochester, MN (US); Matthew Stephen Doyle, Rochester, MN (US); Thomas Donald Kidd, Stewartville, MN (US); Joseph Kuczynski, Rochester, MN (US); Kevin Albert Splittstoesser, Stewartville, MN (US); Timothy Jerome Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/948,049

(22) Filed: Nov. 17, 2010

(65) Prior Publication Data
US 2012/0122342 A1    May 17, 2012

(51) Int. Cl.
*H01R 13/66* (2006.01)

(52) U.S. Cl. .................................................. 439/620.01

(58) Field of Classification Search .............. 439/620.01, 439/79, 825, 608, 941, 78, 101, 108
See application file for complete search history.

(56) References Cited

U.S. PATENT DOCUMENTS

| 3,496,464 A * | 2/1970 | Tankersley .................. 324/73.1 |
| 3,980,382 A * | 9/1976 | Reeder ........................... 439/581 |
| 6,525,936 B2 * | 2/2003 | Beitelmal et al. ............. 361/695 |
| 6,554,646 B1 * | 4/2003 | Casey ....................... 439/607.53 |
| 7,833,026 B1 * | 11/2010 | Morgan et al. ................ 439/108 |

* cited by examiner

*Primary Examiner* — Jean F Duverne
(74) *Attorney, Agent, or Firm* — Joan Pennington (57) ABSTRACT

A method and connector housing are provided for implementing an impedance gradient connector for board-to-board applications. The impedance gradient connector housing includes a plurality of impedance zones with a first impedance zone including a first mating face with a first Printed Circuit Board (PCB) and with a second impedance zone including a second mating face with a second PCB. Each of the respective predefined impedance zones including the first mating face and the second mating face include a selected impedance to minimize impedance mismatch with associated PCBs.

20 Claims, 6 Drawing Sheets

IMPLEMENTING IMPEDANCE GRADIENT CONNECTOR FOR BOARD-TO-BOARD APPLICATIONS

FIELD OF THE INVENTION

The present invention relates generally to the data processing field, and more particularly, relates to a method and connector housing for implementing an impedance gradient connector for board-to-board applications with the connector housing providing a selected variable impedance at a respective boundary of a pair of Printed Circuit Boards (PCBs), such as the respective boundary of mother and daughter PCBs.

DESCRIPTION OF THE RELATED ART

As used in the following description and claims, a connector housing of the invention for implementing an impedance gradient connector should be understood to broadly include multiple different types of connectors for board-to-board applications or board-to-board connectors including land grid array (LGA) interposers, LGA connectors, right angle board-to-board connectors, in-line board-to-board connectors, and the like.

Typically an impedance mismatch is realized abruptly at the card-to-card connector boundary. Existing state-of-the-art connector technology yields a single impedance value that is not customizable.

For example, an impedance tolerance of 10-15% is permitted in multiple card sources. Often an appreciable impedance mismatch exists between a mother and daughter card, which results in signal degradation and a reduction in operating speed.

Other than sorting or single sourcing cards to eliminate the impedance tolerance, there are no known solutions. Both sorting and single sourcing cards are expensive.

A need exists for an efficient and effective mechanism for implementing an impedance gradient connector for a board-to-board application.

SUMMARY OF THE INVENTION

A principal aspect of the present invention is to provide a method and connector housing for implementing an impedance gradient connector for a board-to-board application. Other important aspects of the present invention are to provide such method and connector housing substantially without negative effects and that will overcome many of the disadvantages of prior art arrangements.

In brief, a method and connector housing are provided for implementing an impedance gradient connector for board-to-board applications. The impedance gradient connector housing includes a plurality of impedance zones with a first impedance zone including a first mating face with a first Printed Circuit Board (PCB) and with a second impedance zone including a second mating face with a second PCB. Each of the respective predefined impedance zones including the first mating face and the second mating face include a selected impedance to minimize impedance mismatch with associated PCBs.

In accordance with features of the invention, an impedance range in the connector housing is selected based upon a statistical analysis of the mean impedance of both the mother and daughter PCBs or cards.

In accordance with features of the invention, the connector housing is molded with variable impedance zones perpendicular to the mating planes to the PCBs.

In accordance with features of the invention, reflected energy at the respective PCB boundary is substantially eliminated, which provides improved power transfer, system speed, and performance.

In accordance with features of the invention, the impedance value of a connector housing is directionally modulated by co-injection of different dielectric constant materials in forming the connector housing.

In accordance with features of the invention, the conductivity optionally is adjusted via carbon-based fillers or metal fibers, which reduces the dielectric constant of the plastic. Increasing the weight fraction of the fiber lowers the dielectric constant.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and connector housing are provided for implementing an impedance gradient connector for board-to-board applications. An impedance range in the connector housing is selected based upon a statistical analysis of the mean impedance of both the mother and daughter cards. The connector housing is molded with variable impedance perpendicular to the mating planes to the PCBs.

Figure 1:
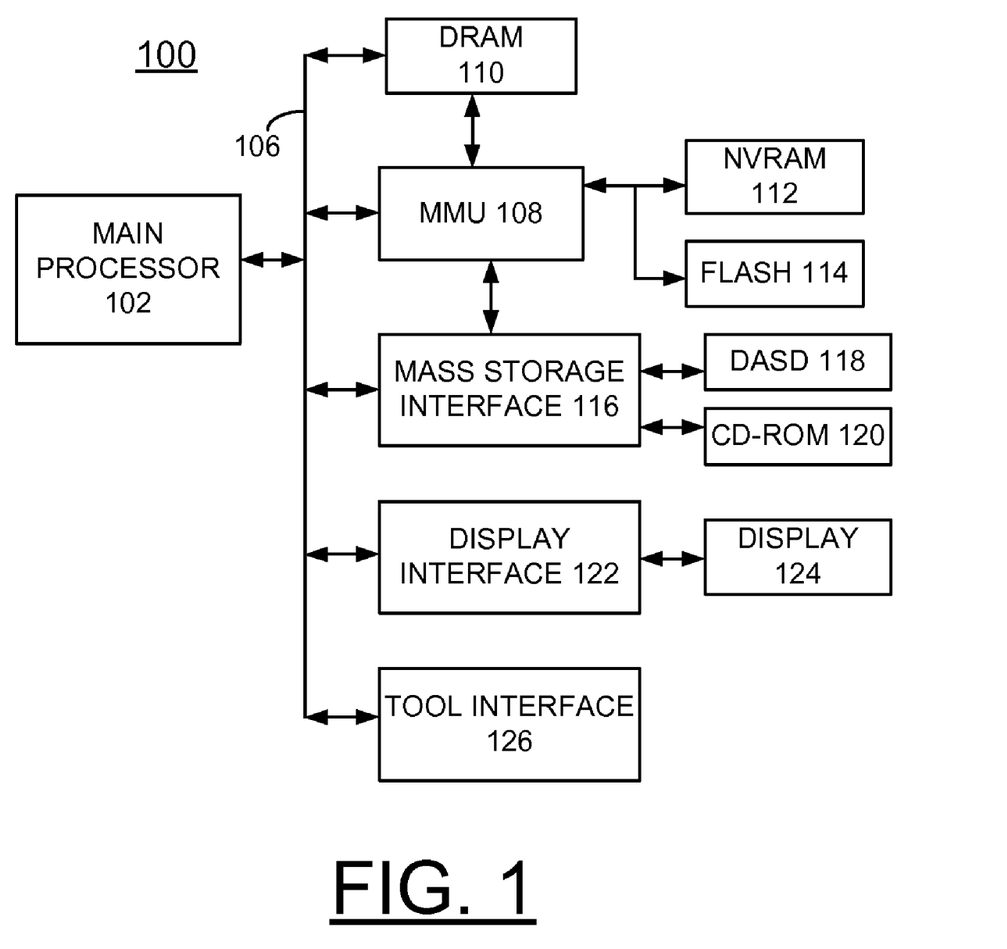
FIGS. 1 and 2 are block diagram representations illustrating an example computer system and operating system for implementing an impedance gradient connector for a board-to-board application in accordance with the preferred embodiment.
Figure 2:
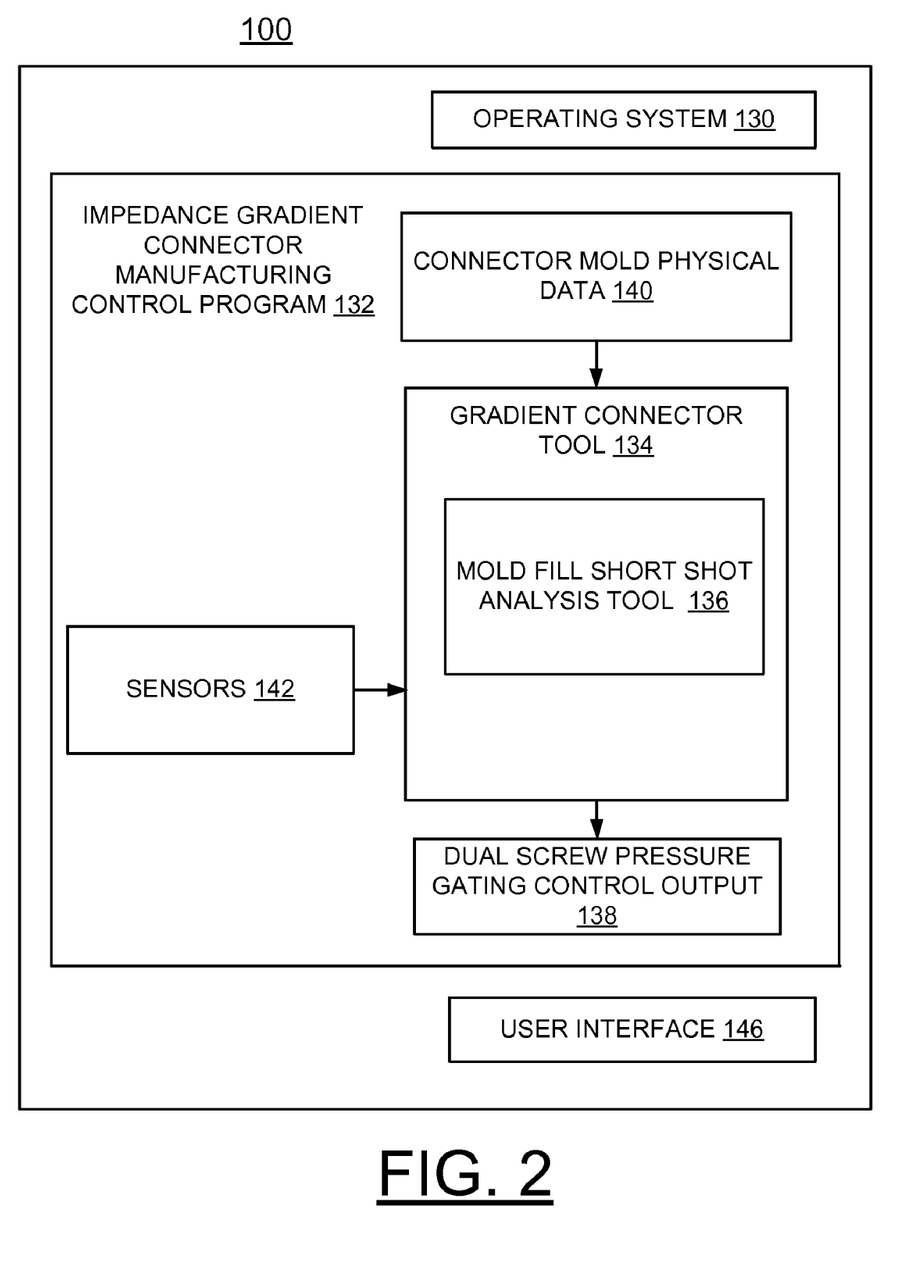

Referring now to the drawings, in FIGS. 1 and 2 there is shown a computer system generally designated by the reference character 100 for implementing an impedance gradient connector for board-to-board applications in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 coupled to the system bus 106 and connected to a display 124. Computer system 100 includes a tool interface 126 for implementing the impedance gradient connector in accordance with the preferred embodiment.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 2, computer system 100 includes an operating system 130, an impedance gradient connector manufacturing control program 132, a gradient connector program or tool 134, a mold fill short shot analysis tool or program 136 of the preferred embodiment, a dual screw pressure gating control output 138 of the preferred embodiment, connector mold physical data 140 describing physical impedance zones for the gradient connector in accordance with the preferred embodiment, a sensors input 142 describing process parameters, and a user interface 146.

Figure 4:
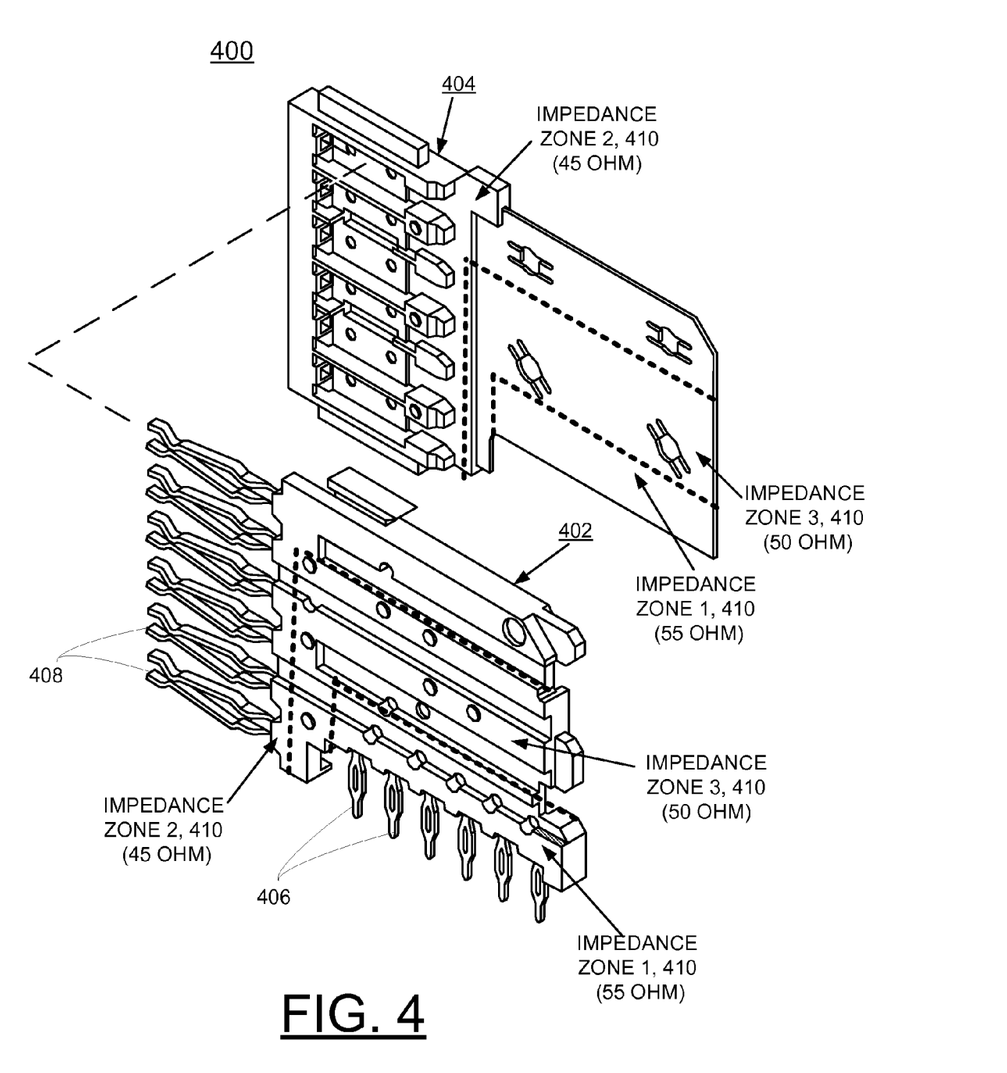
FIGS. 4, 5, and 6 schematically illustrate not to scale assembly steps for an example impedance gradient connector for a board-to-board application in accordance with the preferred embodiment.
Figure 5:
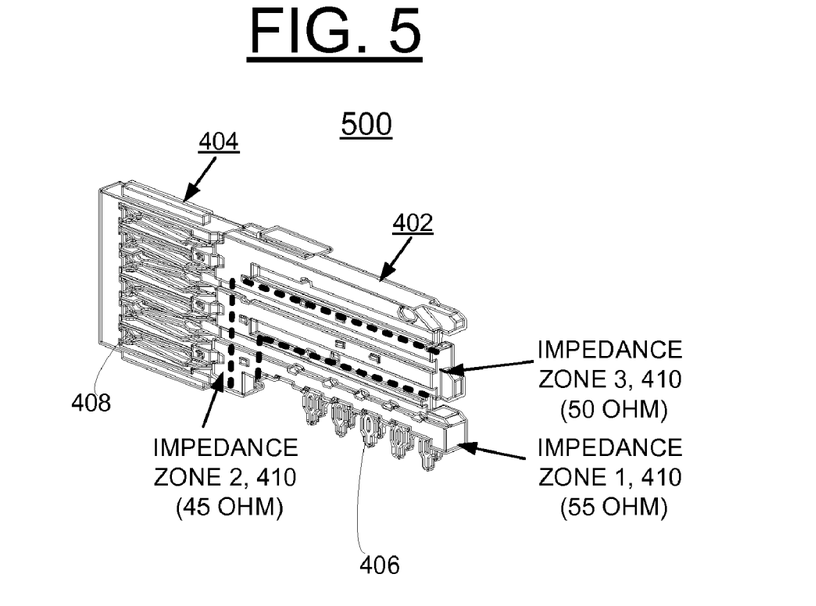
Figure 6:
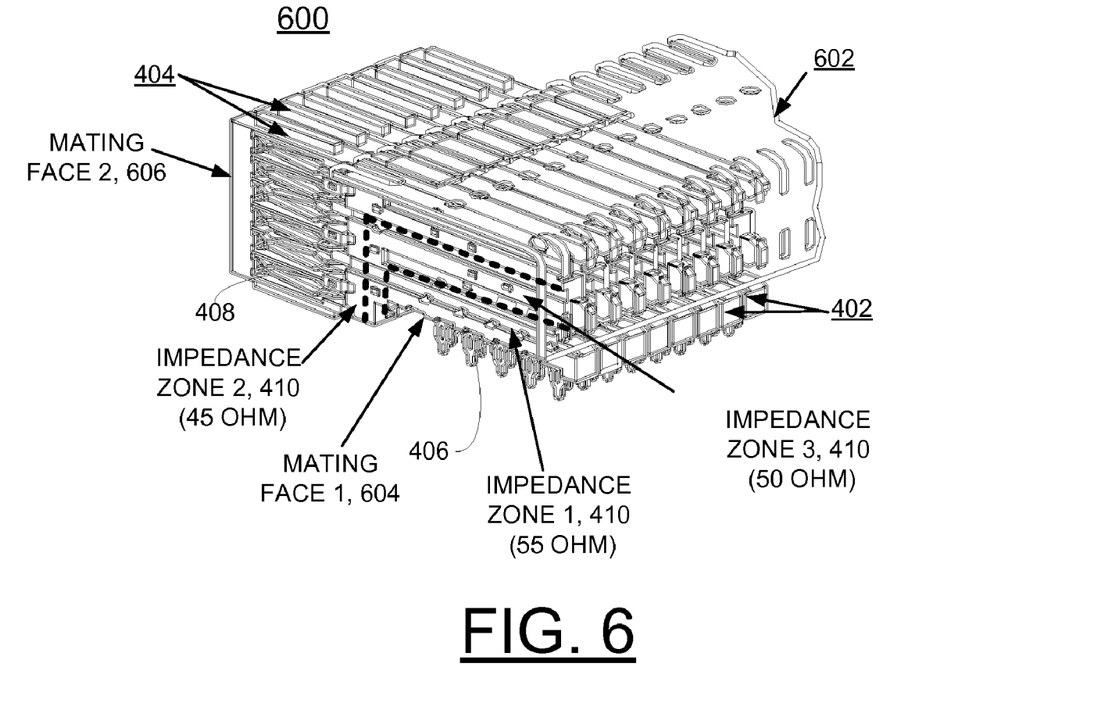

In accordance with features of the invention, an impedance gradient connector for board-to-board applications includes a housing having a first mating face for mating connection to a first Printed Circuit Board (PCB) and a second mating face for mating connection to a second PCB, for example, as illustrated and described with respect to FIGS. 4, 5, and 6. The connector housing has a respective selected predefined impedance proximate to the first mating face and the second mating face. An impedance range in the connector housing is selected based upon a statistical analysis of the mean impedance of both the mother and daughter cards. Advantages include substantial elimination of reflected energy at each PCB boundary, which translates to improved power transfer, system speed, and performance.

In accordance with features of the invention, twin injection molding screws are simultaneously gated to the same mold. Each hopper contains the same base thermoplastic material with different loading levels of a filler that provides the desired conductivity. Conductivity is adjusted via carbon-based fillers or metal fibers, which reduces the dielectric constant of a base thermoplastic material. Increasing the weight fraction of the fiber lowers the dielectric constant.

Figure 3:
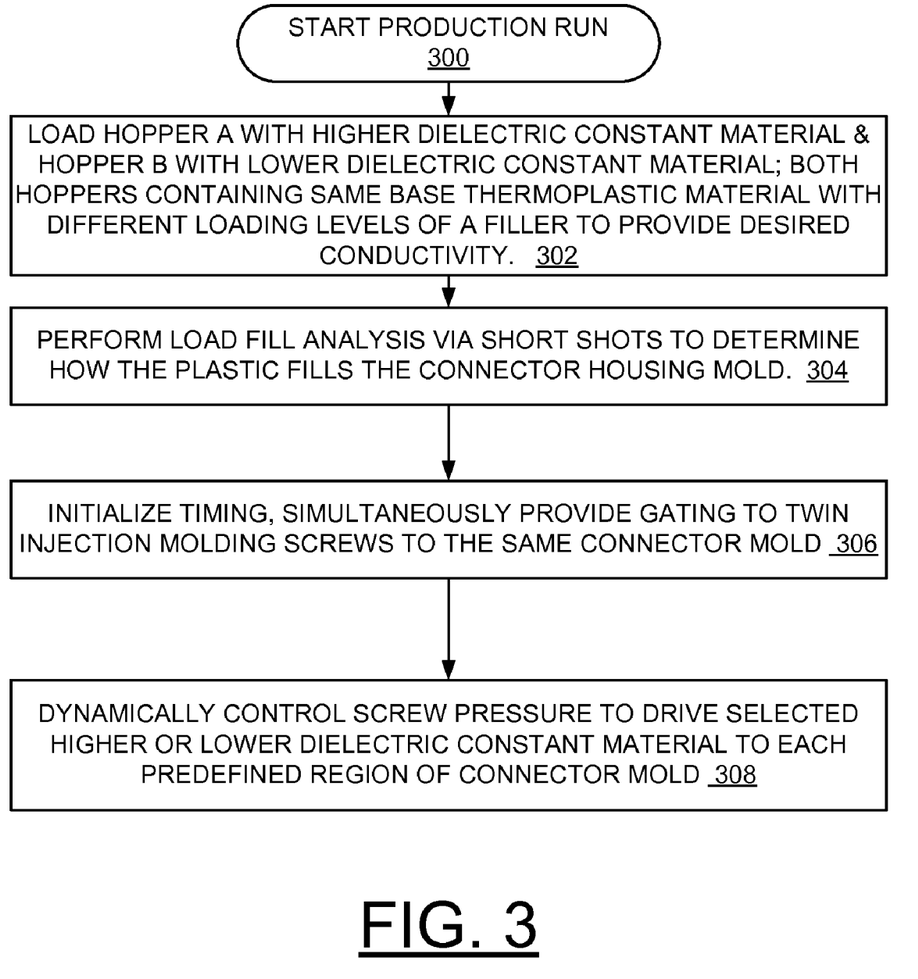
FIG. 3 is a flow chart illustrating exemplary sequential steps for implementing an impedance gradient connector for a board-to-board application in accordance with the preferred embodiment.

Referring to FIG. 3, there is shown example sequential steps for implementing an impedance gradient connector for a board-to-board application in accordance with the preferred embodiment starting with a production run as indicated at a block 300. As indicated at a block 302, a first hopper A is loaded with higher dielectric constant material; and a hopper B is loaded with lower dielectric material. Both hoppers contain a same base thermoplastic with different loading levels of a filler material that provides the desired conductivity at block 302. Mold fill analysis via short shots is performed to determine how the plastic fills the connector housing mold as indicated at a block 304. Timing is initialized, and gating is simultaneously provided to twin injection molding screws to the same connector mold as indicated at a block 306. Screw pressure of each screw is dynamically controlled to drive a selected higher or lower dielectric constant material to each predefined region of the connector mold as indicated at a block 308. For example, if a higher dielectric constant is desired in a certain region, the pressure of screw A is increased to drive higher dielectric constant material through the gate at block 308.

FIGS. 4, 5, and 6 schematically illustrate not to scale an assembly process for an example impedance gradient connector for a board-to-board application in accordance with the preferred embodiment. In FIG. 4, an example initial assembly of an impedance gradient connector generally designated by the reference character 400 includes a first connector housing member generally designated by the reference character 402 and a second connector housing member generally designated by the reference character 404. The first connector housing member supports a plurality of electrical conductive members or terminals 406, for electrical and mechanical connection with a mother PCB (not shown), and a plurality of electrical conductive members or terminals 408, for electrical and mechanical connection with a daughter PCB (not shown).

The first connector housing member 402 and the second connector housing member 404 include a plurality of corresponding impedance zones, 410 indicated by dashed lines. The plurality of corresponding housing impedance zones, 410 including a first impedance zone 1, 410, such as a 55 Ohm impedance zone perpendicular to the mating plane with the mother PCB connected by terminals 406. The plurality of corresponding housing impedance zones, 410 including a second impedance zone 2, 410, such as a 45 Ohm impedance zone perpendicular to the mating plane with the daughter PCB connected by terminals 408. A third impedance zone 3, 410, such as a 50 Ohm impedance zone is disposed between the first 45 Ohm impedance zone 1, 410 and the second 55 Ohm impedance zone 2, 410.

Referring also to FIG. 5, an example assembly generally designated by the reference character 500 illustrates the first connector housing member 402 and the second connector housing member 404 assembled together, and illustrating the plurality of corresponding respective impedance zones, 410, zones 1, 2, 3 are placed in close proximity.

Referring also to FIG. 6, an example assembly generally designated by the reference character 600 illustrates the impedance gradient connector for a board-to-board application in accordance with the preferred embodiment with an additional housing member 602, and illustrating the plurality of corresponding respective impedance zones, 410, zones 1, 2, 3. The impedance zone 1, 410 providing a first mating face 1, 604 with the mother PCB connected by terminals 406. The impedance zone 2, 410 providing a second mating face 2, 606 with the daughter PCB connected by terminals 408.

The first connector housing member 402 and the second connector housing member 404 are made from a suitable base thermoplastic material with different selected loading levels of a selected filler or metal fibers to provide the plurality of corresponding respective impedance zones, 410, zones 1, 2, 3, implemented for example, by co-injection during injection molding of the members. The plurality of electrical conductive members or terminals 406 and the plurality of electrical conductive members or terminals 408 are formed of a selected electrically conductive material, such as aluminum, copper, or beryllium copper.

Figure 7:
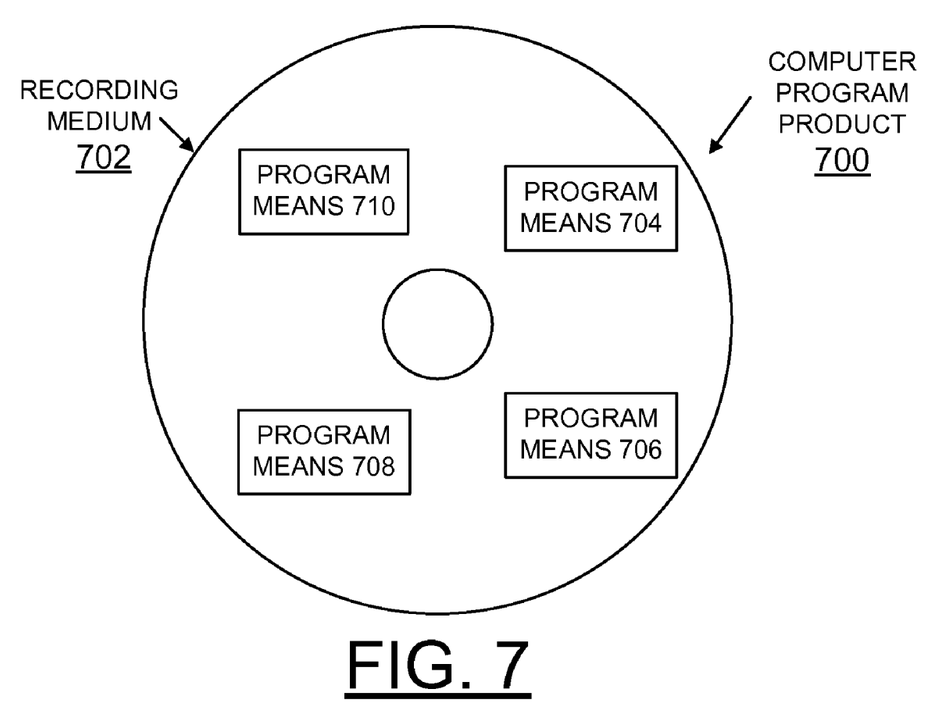
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, or another similar computer program product. Recording medium 702 stores program means 704, 706, 708, 710 on the medium 702 for carrying out the methods for implementing an impedance gradient connector for a board-to-board application of the preferred embodiment in the system 100 of FIGS. 1 and 2.

A sequence of program instructions or a logical assembly of one or more interrelated modules defined by the recorded program means 704, 706, 708, 710, direct the computer system 100 for implementing an impedance gradient connector for a board-to-board application of the preferred embodiment.

While the present invention has been described with reference to the details of the embodiments of the invention shown in the drawing, these details are not intended to limit the scope of the invention as claimed in the appended claims.

What is claimed is:

1. An impedance gradient connector for board-to-board applications comprising:
   a connector housing including a plurality of impedance zones;
   a first impedance zone of said plurality of impedance zones including a first mating face with a first Printed Circuit Board (PCB);
   a second impedance zone of said plurality of impedance zones including a second mating face with a second PCB; and
   each of said first and said second impedance zones including a selected impedance; said selected impedance determined by a dielectric constant of a respective housing material forming said first impedance zone and said second material.

2. The impedance gradient connector as recited in claim 1 wherein said connector housing is formed of a thermoplastic material.

3. The impedance gradient connector as recited in claim 1 wherein said selected impedance of each of said first and said second impedance zones is selected to minimize impedance mismatch with associated PCBs.

4. The impedance gradient connector as recited in claim 1 wherein said connector housing is formed of a first dielectric constant material; and a second dielectric constant material; said first and second dielectric constant materials being combined to provide said plurality of impedance zones.

5. The impedance gradient connector as recited in claim 1 wherein said connector housing is formed of a first dielectric constant material; and a second dielectric constant material; said first and second dielectric constant materials being formed by a base thermoplastic material with different loading levels of a filler to provide a selected conductivity.

6. The impedance gradient connector as recited in claim 5 wherein said filler includes a selected carbon-based filler.

7. The impedance gradient connector as recited in claim 5 wherein said filler includes metal fibers.

8. The impedance gradient connector as recited in claim 1 wherein each of said first impedance zone and said second impedance zone supports a plurality of electrical conductive members.

9. The impedance gradient connector as recited in claim 8 wherein said plurality of electrical conductive members is formed of beryllium copper.

10. A computer-implemented method for implementing an impedance gradient connector for board-to-board applications comprising:
    forming a connector housing including a plurality of impedance zones;
    providing a first impedance zone of said plurality of impedance zones including a first mating face with a first Printed Circuit Board (PCB);
    providing a second impedance zone of said plurality of impedance zones including a second mating face with a second PCB; and
    providing a selected impedance for each of said first and said second impedance zones by forming said first impedance zone and said second impedance zone having said selected impedance determined by a dielectric constant of a respective housing material.

11. The computer-implemented method as recited in claim 10 wherein forming a connector housing including a plurality of impedance zones includes providing a first dielectric constant material; and a second dielectric constant material coupled to a connector housing mold.

12. The computer-implemented method as recited in claim 11 includes simultaneously gating said first dielectric constant material and said second dielectric constant material to said connector housing mold, and dynamically controlling a pressure to drive said first dielectric constant material or said second dielectric constant material to a predefined region of said connector housing mold.

13. The computer-implemented method as recited in claim 11 wherein providing a first dielectric constant material; and a second dielectric constant material includes providing a base thermoplastic material with different loading levels of a filler to provide a selected conductivity for said first and second dielectric constant materials.

14. The computer-implemented method as recited in claim 10 wherein providing said selected impedance of each of said first and said second impedance zones includes providing each said selected impedance to minimize impedance mismatch with a respective associated PCB.

15. The computer-implemented method as recited in claim 10 includes providing a plurality of electrical conductive members supported by said first and said second impedance zones for connection with said first PCB and with said second PCB.

16. A connector housing for implementing an impedance gradient connector for board-to-board applications comprising:
    a plurality of impedance zones;
    a first impedance zone of said plurality of impedance zones including a first mating face with a first Printed Circuit Board (PCB);
    a second impedance zone of said plurality of impedance zones including a second mating face with a second PCB; and
    each of said first and said second impedance zones including a selected impedance; said selected impedance determined by a dielectric constant of a respective housing material forming said first impedance zone and said second impedance zone.

17. The connector housing as recited in claim 16 wherein said first impedance zone includes a selected first impedance to minimize impedance mismatch with said first PCB.

18. The connector housing as recited in claim 16 wherein said second impedance zone includes a selected second impedance to minimize impedance mismatch with said second PCB.

19. The connector housing as recited in claim 16 wherein said connector housing is formed by co-injection molding of a first dielectric constant material and a second dielectric constant material coupled to a connector housing mold.

20. The connector housing as recited in claim 16 wherein said first dielectric constant material and said second dielectric constant material are formed by a base thermoplastic material with different loading levels of a filler to provide a selected conductivity.

* * * * *